United States Patent
Murakami et al.

(10) Patent No.: US 7,243,638 B2
(45) Date of Patent: Jul. 17, 2007

(54) FUEL INJECTION CONTROL METHOD

(75) Inventors: Tsutomu Murakami, Kanagawa (JP);
Naohiro Ikeda, Kanagawa (JP)

(73) Assignee: Nikki Co., Ltd. (JP)

( * ) Notice: Subject to any disclaimer, the term of this patent is extended or adjusted under 35 U.S.C. 154(b) by 0 days.

(21) Appl. No.: 11/204,350

(22) Filed: Aug. 16, 2005

(65) Prior Publication Data
US 2007/0039593 A1    Feb. 22, 2007

(51) Int. Cl.
*F02D 41/34*    (2006.01)
(52) U.S. Cl. ........................ 123/475; 123/478
(58) Field of Classification Search ................ 123/472, 123/475, 476, 478, 494
See application file for complete search history.

(56) References Cited

U.S. PATENT DOCUMENTS

| | | | | |
|---|---|---|---|---|
| 5,325,835 A | * | 7/1994 | Kimata et al. ............... | 123/475 |
| 6,626,153 B2 | * | 9/2003 | Hirano et al. ............... | 123/475 |

FOREIGN PATENT DOCUMENTS

| | | |
|---|---|---|
| JP | 2001-207902 A | 8/2001 |
| JP | 2002-364435 A | 12/2002 |

* cited by examiner

*Primary Examiner*—T. M. Argenbright
(74) *Attorney, Agent, or Firm*—Rader, Fishman, & Grauer PLLC

(57) ABSTRACT

An injection timing for supplying a fuel by one injection per two rotations to a single-cylinder four-cycle engine of a fixed spark advance ignition system is decided on the basis of a simple system. With respect to ignition signals $A_1$, $B_1$, $A_2$, $B_2$, ... generated every one rotation of the engine, an intake pipe pressure lowering state exists in one ignition signal cycle $A_1$-$B_2$, and the intake pipe pressure lowering state does not exist in the next ignition signal cycle $B_2$-$A_2$. The signal $B_1$ corresponds to a terminal phase of an exhaust stroke and the signal $A_2$ corresponds to a terminal phase of a compression stroke if these two conditions are established, and an injection timing is decided on the basis of the determination in such a manner that the fuel injection burnt by the ignition of $A_2$ is executed at one time during two rotations.

8 Claims, 2 Drawing Sheets

FUEL INJECTION CONTROL METHOD

BACKGROUND OF THE INVENTION

1. Field of the Invention

The present invention relates to a fuel injection control method which can determine an injection timing of a fuel by a simple system in the case of supplying the fuel to a four-cycle engine on the basis of one injection per two rotations by using an electronic control type fuel injection apparatus.

2. Description of the Related Art

As one method of determining an injection timing of the fuel in the case of supplying the fuel to the four-cycle engine by using the electronic control type fuel injection apparatus, Japanese Unexamined Patent Publication No. 2002-364435 describes a technique of utilizing a primary voltage of an ignition coil as a signal for determining the injection timing in a structure employing a fixed spark advance ignition system in synchronous with an engine rotation. In other words, the technique described in this publication is structured such that a magnet is provided at a predetermined position in an outer peripheral portion of a flywheel attached to a crank shaft of an engine, an ignition coil is arranged at an opposing position in an outer periphery, a spark is generated in an ignition plug on the basis of a secondary voltage generated by a voltage induced in the ignition coil by the magnet per one rotation of the flywheel, and the primary voltage of the ignition coil is picked up so as to be utilized as the signal for determining the injection timing.

In accordance with this method, since the method uses the primary voltage of the ignition coil in the fixed spark advance ignition system using the flywheel, there is an advantage that the structure is extremely simple and can be inexpensively provided. However, since one injection is performed per one rotation in this structure, there is a risk that a working frequency of the fuel injection valve is twice of the structure in which one injection is performed per two rotations of the engine, thereby generating a problem in a durability, and an ineffective pulse width of the fuel injection valve becomes twice, whereby it is hard to secure a dynamic range. In addition, if a fuel injection valve having a low discharge pressure is used and is injected in an intake stroke of the engine, an atomization of the fuel is effectively performed, so that it is possible to intend to improve a fuel stability. However, since the intake stroke can not be specified by the method mentioned above, it is improper to use the fuel injection valve having the low discharge pressure.

As the other method of determining the injection timing of the fuel in the four-cycle engine, Japanese unexamined Patent Publication No. 2001-207902 describes a technique of discriminating what stroke the cylinder of the engine exists on the basis of a crank angle of the engine and an intake pipe pressure so as to determine the injection timing. In other words, the technique described in this publication uses a crank angle sensor in which a timing rotor having a lot of projection portions in an outer peripheral surface is attached to a crank shaft of the engine, and a pickup coil is arranged at an opposing position in an outer periphery thereof, and an intake pipe pressure sensor, discriminates that the engine is in an intake stroke, particularly, in a starting time thereof on the basis of signals from these two sensors or discriminates that the engine is in a compression stroke, particularly, in a starting time thereof, thereby determining the injection timing.

In accordance with the method, it is possible to determine the injection timing of one injection per two rotations at a desired time, for example, the injection is finished before the intake stroke or the like. However, since this structure uses the crank angle sensor and the intake pipe pressure sensor so as to discriminate the stroke of the engine and output the predetermined injection signal and ignition signal to the fuel injection valve ignition coil, it is determined an ignition spark advance property without using a cam shaft phase detecting sensor, however, since the crank angle sensor is necessary in addition to the ignition coil, the structure is not satisfactory in achieving an object that an inexpensive structure is provided by reducing a number of constituting parts.

The present invention intends to achieve the problem that it is impossible to supply the fuel to the four-cycle engine, particularly, of a single cylinder, on the basis of one injection per two rotations, and to ignite and burn in accordance with a fixed spark advance system, by the prior art mentioned above, and an object of the present invention is to determine a timing of the injection performed at one time per two rotation in accordance with an extremely simple procedure.

SUMMARY OF THE INVENTION

In the present invention, in order to enable one injection per two rotations in accordance with a fixed spark advance ignition system, the structure is made such as to utilize a primary voltage generated in an ignition coil generating an ignition current operating an ignition plug in synchronous with an engine rotation, use a pressure signal output by a pressure sensor detecting an intake pipe pressure and serving as an engine stroke discriminating means, and determine an injection timing on the basis of an ignition signal and a pressure signal by an electronic type control apparatus outputting an ignition signal to a fuel injection valve.

In other words, in accordance with a first means, there is provided a means for checking out that a state in which the intake pipe pressure is lowered exists within one cycle of the ignition signal generated per one rotation of the engine and the state in which the intake pipe pressure is lowered does not exist within the next cycle, determining an ignition signal generating time point of starting the cycle that the state in which the intake pipe pressure is lowered does not exist and an ignition signal generating time point of finishing as a compression stroke terminal phase and an exhaust stroke terminal phase respectively at a time when the confirmation is performed, and deciding an injection timing on the basis of the determination.

In more particular, the structure is made such as to sample the intake pipe pressure at a fixed interval on the basis of a pressure signal in the electronic type control apparatus, first search whether or not a state in which the intake pipe pressure is continuously lowered over a predetermined sampling number exists within a certain ignition signal cycle, second search whether or not a state in which the intake pipe pressure is lowered does not exist within the next ignition signal cycle at a time when the existence of the state is confirmed, and determine the respective ignition signal generating time points of starting and finishing the next ignition signal cycle as the compression stroke terminal phase and the exhaust stroke terminal phase at a time when non-existence of the state is confirmed.

Further, in accordance with a second means, there is provided a means for checking out that a state in which the intake pipe pressure is lowered does not exist within one cycle of the ignition signal generated per one rotation of the engine and the state in which the intake pipe pressure is lowered exists within the next cycle, determining an ignition signal generating time point of starting the cycle that the state in which the intake pipe pressure is lowered exists and an ignition signal generating time point of finishing as an exhaust stroke terminal phase and a compression stroke terminal phase respectively at a time when the confirmation is performed, and deciding an injection timing on the basis of the determination.

In more particular, the structure is made such as to sample the intake pipe pressure at a fixed interval on the basis of a pressure signal in the electronic type control apparatus, first search whether or not a state in which the intake pipe pressure is lowered exists within a certain ignition signal cycle, second search whether or not a state in which the intake pipe pressure is continuously lowered over a predetermined sampling number exists within the next ignition signal cycle at a time when the non-existence of the state is confirmed, and determine the respective ignition signal generating time points of starting and finishing the next ignition signal cycle as the exhaust stroke terminal phase and the compression stroke terminal phase at a time when the existence of the state is confirmed.

In a fixed spark advance ignition system in which an ignition coil actuates an ignition plug per one rotation of a crank shaft, it is possible to decide an injection timing of the fuel burned in accordance with an ignition current generated by an ignition coil at a terminal phase of a compression stroke to a proper time during two rotations of a crank shaft, for example, an ignition signal generating time point in the terminal phase of the compression stroke, an ignition signal generating time point in a terminal phase of an exhaust stroke, or an appropriate time point between the ignition signal generating time points, by determining what stroke an engine cylinder exists at a time when an ignition signal is generated by detecting a change state of an intake pipe pressure, thereby controlling a fuel injection valve in such a manner that one injection is performed per two rotations.

In accordance with the present invention, in the fixed spark advance ignition system which is synchronized with the rotation of the four-cycle engine, it is possible to decide the injection timing in such a manner that one injection per two rotations is properly executed in accordance with an extremely simple procedure of determining what stroke the cylinder of the engine exists at the ignition signal generating time on the basis of the ignition signal obtained from the ignition coil generating one ignition current per one rotation, and the pressure signal obtained by detecting the intake pipe pressure. Further, it is possible to improve a fuel atomization so as to intend to improve a combustion stability, by easily securing the dynamic range without lowering a durability of the fuel injection valve, and setting the injection timing to the intake stroke so as to use the fuel injection valve having the low discharge pressure.

DESCRIPTION OF THE PREFERRED EMBODIMENTS

Figure 1:
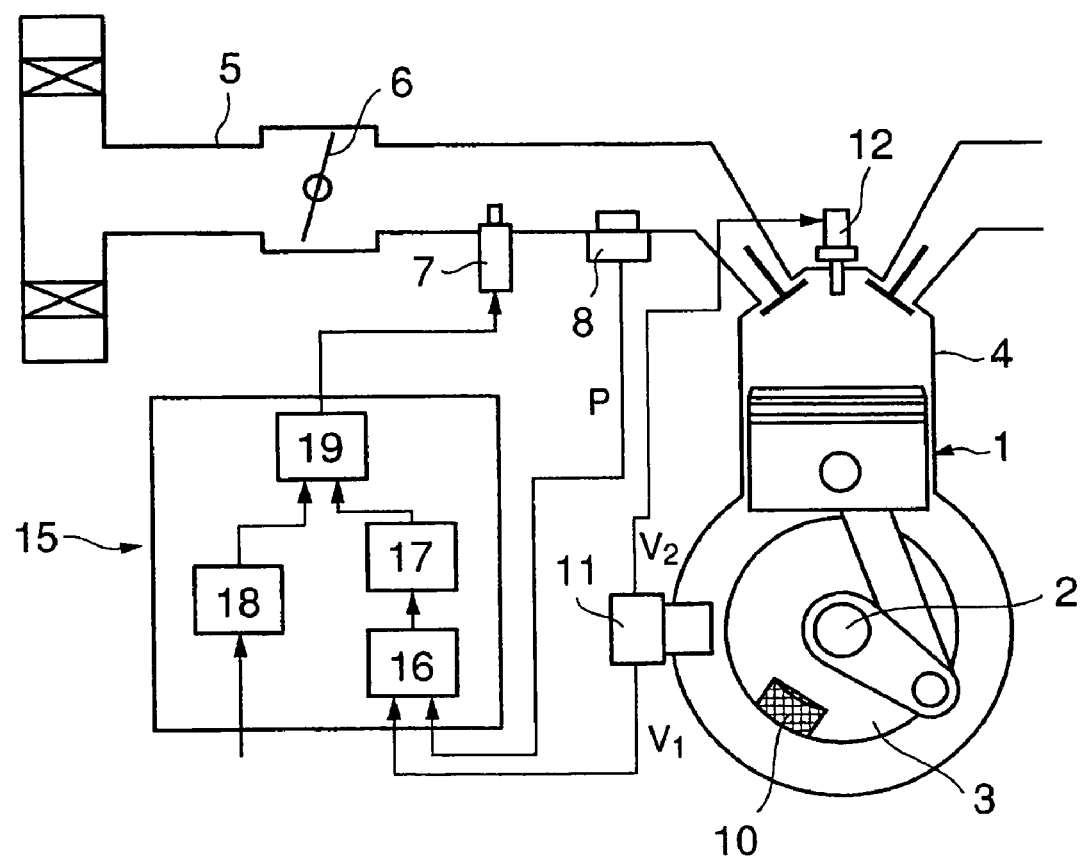
FIG. 1 is a layout view of an engine to which the present invention is applied.

A description will be given of an embodiment in accordance with the present invention with reference to the accompanying drawings. FIG. 1 is a layout view of an engine to which the present invention is applied. A throttle valve 6, a fuel injection valve 7 and a pressure sensor 8 are placed in an intake pipe 5 connected to a cylinder 2 of a one-cylinder four-cycle engine 1. Further, a magnet 10 is equipped in a predetermined position of an outer peripheral portion of a flywheel 3 attached to a crank shaft 2 of the engine 1, and an ignition coil 11 is placed in an opposing position in an outer periphery thereof. The magnet 10 induces a primary voltage $V_1$ in a primary coil of the ignition coil 11 per one rotation of the crank shaft 2, thereby generating a secondary voltage $V_2$ in a secondary coil. The secondary voltage $V_2$ generates a spark in an ignition plug 12 so as to ignite and burn an air-fuel mixture supplied to the cylinder 4.

On the other hand, there is prepared an electronic type control apparatus 15 outputting a drive signal to the fuel injection valve 7 so as to supply a fuel in correspondence to an operating state of the engine 1. The electronic type control apparatus 15 is provided with a stroke determining means 16 for determining what stroke the engine 1 exists at a time when the primary voltage is generated, by using an intake pipe pressure P detected by the pressure sensor 8 and the primary voltage $V_1$ generated in the ignition plug 11, an injection timing deciding means 17 for deciding an injection timing on the basis of the determination, an injection amount setting means 18 for calculating a fuel supply amount in correspondence to the operating state of the engine 1, and an injection signal generating means 19 for driving an opening and closing operation of the fuel injection valve 7 in such a manner as to inject the fuel at a supply amount calculated by the decided injection timing.

Figure 2:
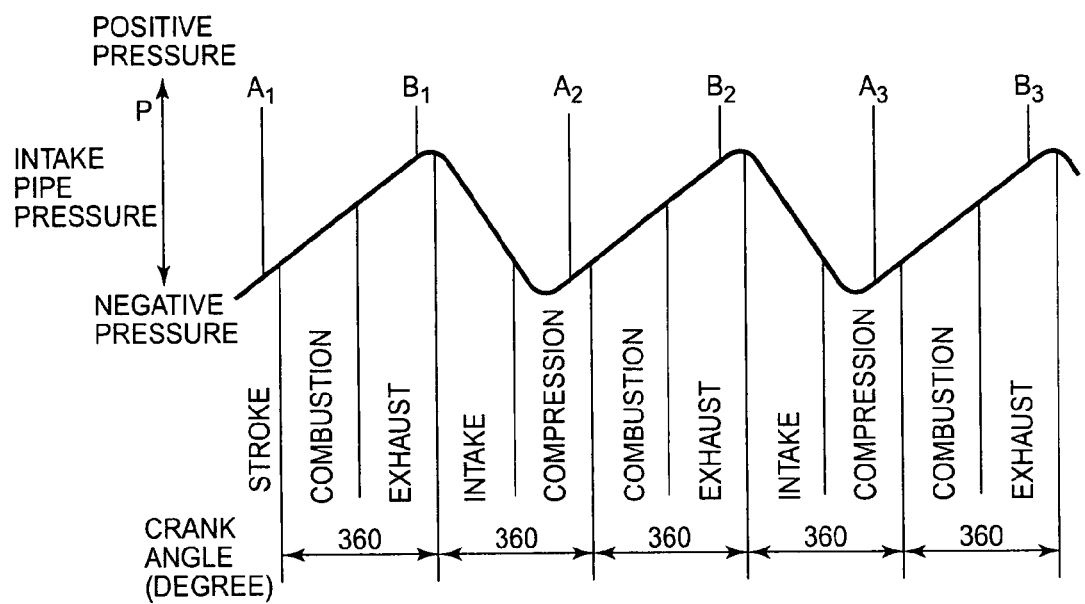
FIG. 2 is a wave form chart of an intake pipe pressure for explaining a procedure of executing a stroke discrimination at a time when an ignition signal is generated.

FIG. 2 is a view explaining one example of a procedure of determining what stroke the engine 1 exists at a time point when the ignition coil 11 generates an ignition voltage. The intake pipe pressure P repeats a wave form as shown in the drawing in accordance with the stroke of the engine 1, that is, a crank angle. Further, in the present embodiment, an attaching position of the magnet 10 and a placing position of the ignition coil 11 are set in such a manner as to generate the ignition voltage just before a top dead center of an exhaust stroke and just before a top dead center of a compression stroke. In this case, intake, compression, combustion and exhaust explaining the strokes in the drawing are respectively described for abbreviating an intake stroke, a compression stroke, a combustion stroke and an exhaust stroke.

Since the primary voltage $V_1$ of the ignition coil 11 is set to the fixed spark advance system, it is input to a stroke determining means 16 alternately as ignition signals $A_1$, $A_2$, $A_3$, . . . generated at one time per two rotations little time prior to the combustion stroke, that is, at the terminal phase of the compression stroke, and ignition signals $B_1$, $B_2$, $B_3$, . . . generated at one time per two rotations little time prior to the intake stroke corresponding to an intermediate thereof, that is, at the terminal phase of the exhaust stroke, every 360 degree of the crank angle. On the other hand, the intake pipe pressure P corresponding to the pressure signal input to the stroke determining means 16 is sampled at a fixed short time interval.

When the ignition signal, for example, $B_1$ is input to the stroke determining means 16, the change of the intake pipe pressure P until the next ignition signal a2 is input from the time point is measured on the basis of the sampled pressure value, and it is searched whether or not a state in which the intake pipe pressure P is continuously lowered over a predetermined sampling number exists within the ignition signal cycle. In the present embodiment, since the ignition signal $B_1$ of the search start is generated in the terminal phase of the exhaust stroke, and the measurement of the intake pipe pressure P is mainly executed in the intake stroke, it is confirmed that there exists the state in which the intake pipe pressure P is continuously lowered over the predetermined sampling number. Accordingly, it is determined that the generating time point of the end ignition signal $A_2$ generated by one rotation of the crank shaft 2 after the generation of the ignition signal $B_1$ exists in the terminal phase of the compression stroke.

When the ignition signal $A_2$ is input to the stroke determining means 16, the change of the intake pipe pressure P until the next ignition signal $B_2$ is input from the time point is successively measured on the basis of the sampled pressure value if the existence of the state mentioned above is confirmed, and it is searched whether or not the state in which the intake pipe pressure P is lowered exists within the ignition signal cycle. In the present embodiment, since the ignition signal $A_2$ of the next search start is generated in the terminal phase of the compression stroke, and the measurement of the intake pipe pressure P is executed in a section from the combustion stroke to the exhaust stroke, it is confirmed that the state in which the intake pipe pressure P is lowered does not exist. Accordingly, it is determined that the generating time point of the end ignition signal $B_2$ generated by one rotation of the crank shaft 2 after the generation of the ignition signal $A_2$ exists in the terminal phase of the exhaust stroke.

Further, it is determined that the generating time point of the ignition signals $A_1, A_2, A_3, \ldots$ is always the terminal phase of the compression stroke, and the generating time point of the ignition signals $B_1, B_2, B_3, \ldots$ is always the terminal phase of the exhaust stroke even if the engine speed is changed, by applying the search and confirmation which are executed about the cycles $B_1$-$A_2$ and $A_2$-$B_2$, to each of the next ignition signal cycles $B_2$-$A_3$ and $A_3$-$B_3$, and repeating the same procedure thereafter.

Further, the result of determination mentioned above is input to the injection timing deciding means 17, and a timing for injecting the fuel for forming the air-fuel mixture to be ignited and burnt is decided on the basis of the secondary voltage $V_2$ generated by the ignition coil 11 at the terminal phase of the compression stroke. In other words, since each of the cycles of the ignition signals $A_1$-$B_1$, $A_2$-$B_2$, $A_3$-$B_3$, $\ldots$ exists in the range of 360 degree of the crank angle from the terminal phase of the compression stroke to the terminal phase of the exhaust stroke, the ignition signal generating means 19 generates a command for driving an opening and closing operation of the fuel injection valve 7 at the time point when the ignition signals $B_1$, $B_2$ and $B_3$ are input, the time point of detecting that the intake pipe pressure P starts lowering after the intake stroke, or the time point when the sampling value showing that the intake pipe pressure P is lowered reaches a certain number, thereby achieving an injection timing when the injection is executed by the intake stroke. In this case, the ignition signal decision is not executed, and it is accordingly possible to execute one injection per two rotations.

In the embodiment described above, the structure is made such as to set the sequentially generated ignition signals to combinations $B_1$-$A_2$, $A_2$-$B_2$, $B_2$-$A_3$, $A_3$-$B_3$, $\ldots$, search the state of the change of the intake pipe pressure in each of them so as to execute the stroke discrimination of the ignition signal generating time point, and decide the injection timing on the basis of the generating time point of the ignition signals $B_1$, $B_2$, $B_3$, $\ldots$ determined as the terminal phase of the exhaust stroke, however, the injection timing may be decided at an optional time from the generating time point of the ignition signals $A_1, A_2, A_3, \ldots$ determining the terminal phase of the compression stroke to the time when a certain time has elapsed after the ignition signals $B_1$, $B_2$ and $B_3$ are generated.

The present invention is not limited to the procedure mentioned above, but can decide the injection timing at which the stroke discrimination of the ignition signal generating time point is not executed, in accordance with the procedure mentioned above. In other words, it is searched whether or not the state in which the intake pipe pressure P is lowered does not exist within the ignition signal cycle from the time point when the ignition signal $A_1$ is first input to the time when the next ignition signal $B_1$ is input. In accordance with the present embodiment, since the ignition signal $A_1$ for starting the search is generated in the terminal phase of the compression stroke, and the measurement of the intake pipe pressure P is executed in the section from the combustion stroke to the exhaust stroke, it is confirmed that the state in which the intake pipe pressure P is lowered does not exists, and it is accordingly determined that the generating time point of the end ignition signal $B_1$ generated at a time when the crank shaft 2 rotates at one time from the generation of the ignition signal $A_1$ is the terminal phase of the exhaust stroke.

When the ignition signal $B_1$ is input to the stroke determining means 16, it the non-existence of the state mentioned above is confirmed, it is successively searched whether or not the state in which the intake pipe pressure is continuously lowered over the predetermined sampling number exists within the ignition signal cycle until the next ignition signal $A_2$ is input from the time point. In the present embodiment, since the ignition signal $B_1$ of the search start is generated in the terminal phase of the exhaust stroke, and the measurement of the intake pipe pressure P is mainly executed in the intake stroke, it is confirmed that the state mentioned above exists. Accordingly, it is determined that the generating time point of the end ignition signal $A_2$ generated by one rotation of the crank shaft 2 after the generation of the ignition signal $B_1$ corresponds to the terminal phase of the compression stroke.

Further, it is determined that the generating time point of the ignition signals $A_1, A_2, A_3, \ldots$ is always the terminal phase of the compression stroke, and the generating time point of the ignition signals $B_1, B_2, B_3, \ldots$ is always the terminal phase of the exhaust stroke even if the engine speed is changed, by applying the search and confirmation which are executed about the cycles $A_1$-$B_1$ and $B_1$-$A_2$ mentioned above, to each of the next ignition signal cycles $A_2$-$B_2$ and $B_3$-$A_3$, and repeating the same procedure thereafter.

Further, the injection timing deciding means 17 decides the injection timing at the same time point as described in the preceding embodiment on the basis of the result of determination mentioned above, and executes one injection per two rotations.

As is understood from the matter mentioned above, the present embodiment is preferably applied to the supply of fuel by one injection per two rotations, in the case that the single-cylinder four-cycle engine corresponding to a general-purpose engine frequently used in a power source of a compact vehicle, a farm working machine or the like is set as the fixed spark advance ignition system.

FIG. 2
POSITIVE PRESSURE
INTAKE PIPE PRESSURE
NEGATIVE PRESSURE

STROKE
CRANK ANGLE (DEGREE)
COMBUSTION
EXHAUST
INTAKE
COMPRESSION

What is claimed is:

1. A fuel injection control method, comprising the steps of:

providing an electronic type control apparatus;

using an ignition coil generating an ignition voltage operating an ignition plug in synchronous with an engine rotation, a pressure sensor detecting an intake pipe pressure, and said electronic type control apparatus to which an ignition signal corresponding to a primary voltage generated in said ignition coil and a pressure signal corresponding to an intake pipe pressure detected by said pressure sensor are input and which outputs an ignition signal to a fuel injection valve, wherein said electronic type control apparatus checks out by using said ignition signal and the pressure signal first that a state in which the intake pipe pressure is lowered exists within a certain ignition signal cycle, and second that the state in which the intake pipe pressure is lowered does not exist within the next injection signal cycle, determines that an ignition signal generating time point of said second ignition signal cycle start is a terminal phase of a compression stroke and an end ignition signal generating time point is a terminal phase of an exhaust stroke at a time when said first and second confirmations are executed, and decides an injection timing on the basis of said determination.

2. A fuel injection control method as claimed in claim 1, wherein said electronic type control apparatus samples the intake pipe pressure at a fixed interval on the basis of said input pressure signal, first search whether or not a state in which the intake pipe pressure is continuously lowered over a predetermined sampling number exists within a certain ignition signal cycle, second search whether or not a state in which the intake pipe pressure is lowered does not exist within the next ignition signal cycle at a time when the existence of said state is confirmed, and determine the respective ignition signal generating time points of starting and finishing said next ignition signal cycle as the compression stroke terminal phase and the exhaust stroke terminal phase at a time when the non-existence of said state is confirmed.

3. A fuel injection control method, comprising the steps of:

providing an electronic type control apparatus; and using an ignition coil generating an ignition voltage operating an ignition plug in synchronous with an engine rotation, a pressure sensor detecting an intake pipe pressure, and said electronic type control apparatus to which an ignition signal corresponding to a primary voltage generated in said ignition coil and a pressure signal corresponding to an intake pipe pressure detected by said pressure sensor are input and which outputs an ignition signal to a fuel injection valve, wherein said electronic type control apparatus checks out by using said ignition signal and the pressure signal first that a state in which the intake pipe pressure is lowered does not exist within a certain ignition signal cycle, and second that the state in which the intake pipe pressure is lowered exists within the next injection signal cycle, determines that an ignition signal generating time point of said second ignition signal cycle start is a terminal phase of an exhaust stroke and an end ignition signal generating time point is a terminal phase of a compression stroke at a time when said first and second confirmations are executed, and decides an injection timing on the basis of said determination.

4. A fuel injection control method as claimed in claim 3, wherein said electronic type control apparatus samples the intake pipe pressure at a fixed interval on the basis of said input pressure signal, first search whether or not a state in which the intake pipe pressure is lowered does not exist within a certain ignition signal cycle, second search whether or not a state in which the intake pipe pressure is continuously lowered over a predetermined sampling number exists within the next signal cycle at a time when the non-existence of said state is confirmed, and determine the respective ignition signal generating time points of starting and finishing said next ignition signal cycle as the exhaust stroke terminal phase and the compression stroke terminal phase at a time when the existence of said state is confirmed.

5. A fuel injection control apparatus, comprising:

an electronic type control apparatus; and an ignition coil generating an ignition voltage operating an ignition plug in synchronous with an engine rotation, a pressure sensor detecting an intake pipe pressure, and the electronic type control apparatus to which an ignition signal corresponding to a primary voltage generated in said ignition coil and a pressure signal corresponding to an intake pipe pressure detected by said pressure sensor are input and which outputs an ignition signal to a fuel injection valve, wherein said electronic type control apparatus checks out by using said ignition signal and the pressure signal first that a state in which the intake pipe pressure is lowered exists within a certain ignition signal cycle, and second that the state in which the intake pipe pressure is lowered does not exist within the next injection signal cycle, determines that an ignition signal generating time point of said second ignition signal cycle start is a terminal phase of a compression stroke and an end ignition signal generating time point is a terminal phase of an exhaust stroke at a time when said first and second confirmations are executed, and decides an injection timing on the basis of said determination.

6. A fuel injection control apparatus as claimed in claim 5, wherein said electronic type control apparatus samples the intake pipe pressure at a fixed interval on the basis of said input pressure signal, first search whether or not a state in which the intake pipe pressure is continuously lowered over a predetermined sampling number exists within a certain ignition signal cycle, second search whether or not a state in which the intake pipe pressure is lowered does not exist within the next ignition signal cycle at a time when the existence of said state is confirmed, and determine the respective ignition signal generating time points of starting and finishing said next ignition signal cycle as the compression stroke terminal phase and the exhaust stroke terminal phase at a time when the non-existence of said state is confirmed.

7. A fuel injection control apparatus, comprising:

an electronic type control apparatus; and an ignition coil generating an ignition voltage operating an ignition plug in synchronous with an engine rotation, a pressure sensor detecting an intake pipe pressure, and the electronic type control apparatus to which an ignition signal corresponding to a primary voltage generated in said ignition coil and a pressure signal corresponding to an intake pipe pressure detected by said pressure sensor are input and which outputs an ignition signal to a fuel injection valve, wherein said electronic type control apparatus checks out by using said ignition signal and the pressure signal first that a state in which the intake pipe pressure is lowered does not exist within a certain ignition signal cycle, and second that the state in which the intake pipe pressure is lowered exists within the next injection signal cycle, determines that an ignition signal generating time point of said second ignition signal cycle start is a terminal phase of an exhaust stroke and an end ignition signal generating time point is a terminal phase of a compression stroke at a time when said first and second confirmations are executed, and decides an injection timing on the basis of said determination.

8. A fuel injection control apparatus as claimed in claim 7, wherein said electronic type control apparatus samples the intake pipe pressure at a fixed interval on the basis of said input pressure signal, first search whether or not a state in which the intake pipe pressure is lowered does not exist within a certain ignition signal cycle, second search whether or not a state in which the intake pipe pressure is continuously lowered over a predetermined sampling number exists within the next signal cycle at a time when the non-existence of said state is confirmed, and determine the respective ignition signal generating time points of starting and finishing said next ignition signal cycle as the exhaust stroke terminal phase and the compression stroke terminal phase at a time when the existence of said state is confirmed.

* * * * *